United States Patent [19]

von Holdt

[11] 4,114,849
[45] Sep. 19, 1978

[54] PIVOT MOLD ASSEMBLY

[76] Inventor: John W. von Holdt, 7430 N. Croname Rd., Niles, Ill. 60648

[21] Appl. No.: 781,631

[22] Filed: Mar. 28, 1977

[51] Int. Cl.$^2$ ............................................... B29C 1/14
[52] U.S. Cl. ..................................... 249/58; 249/162; 264/242
[58] Field of Search ............... 249/117, 118, 151, 167, 249/85, 91, 94, 96, 58, 162; 29/774; 425/DIG. 34, 525; 264/259, 242, 249, 297; 164/90

[56] References Cited

U.S. PATENT DOCUMENTS

| | | | |
|---|---|---|---|
| 2,900,666 | 8/1959 | Marcus | 249/58 |
| 3,917,789 | 11/1975 | Heisler | 264/242 X |
| 3,978,189 | 8/1976 | Einhorn | 264/259 X |

*Primary Examiner*—Francis S. Husar
*Assistant Examiner*—John S. Brown
*Attorney, Agent, or Firm*—Charles F. Pigott, Jr.

[57] ABSTRACT

The following specification describes a stop boss formed on the handle of a pair by means of a pair of slides located behind a skirt wall of the pail with the handle passing through a slot in the skirt wall, which is closed by a flange wall formed by the slides. The slides are movably carried in guides by a ring member and are received in a recess of another ring member which conventionally forms the annular pail wall. The guides enable the slides to move laterally toward each other in response to downward movement of the carrying ring member, to define the cavities for forming the stop boss and the flange wall closing the skirt wall slot. On completion of the mold cycle and upward movement of the ring member carrying the slides, the guides move the slides laterally apart to release the stop boss and the flange wall. The slides are then moved from between the skirt and pail walls to enable the pail to be released from the mold.

7 Claims, 12 Drawing Figures

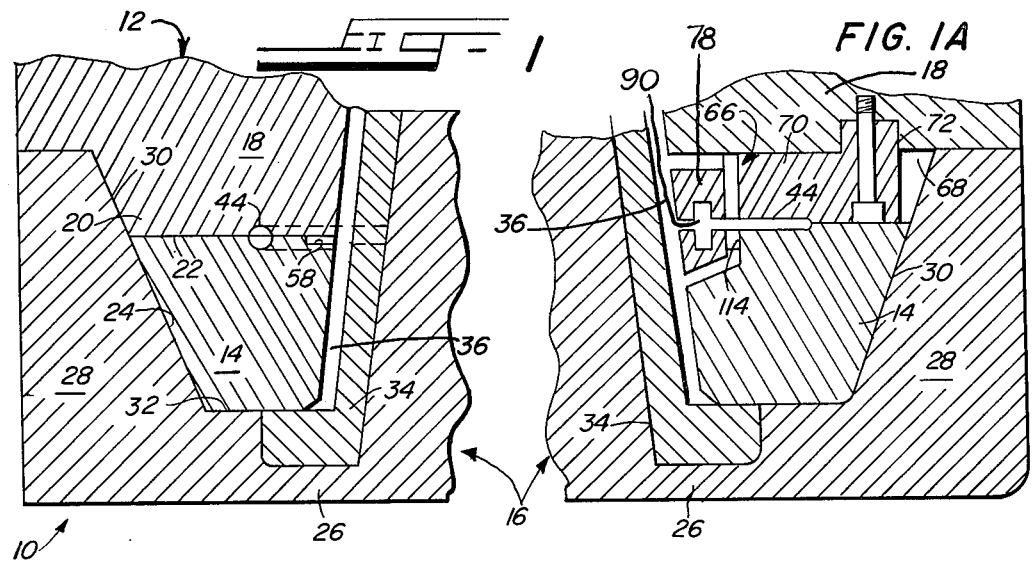
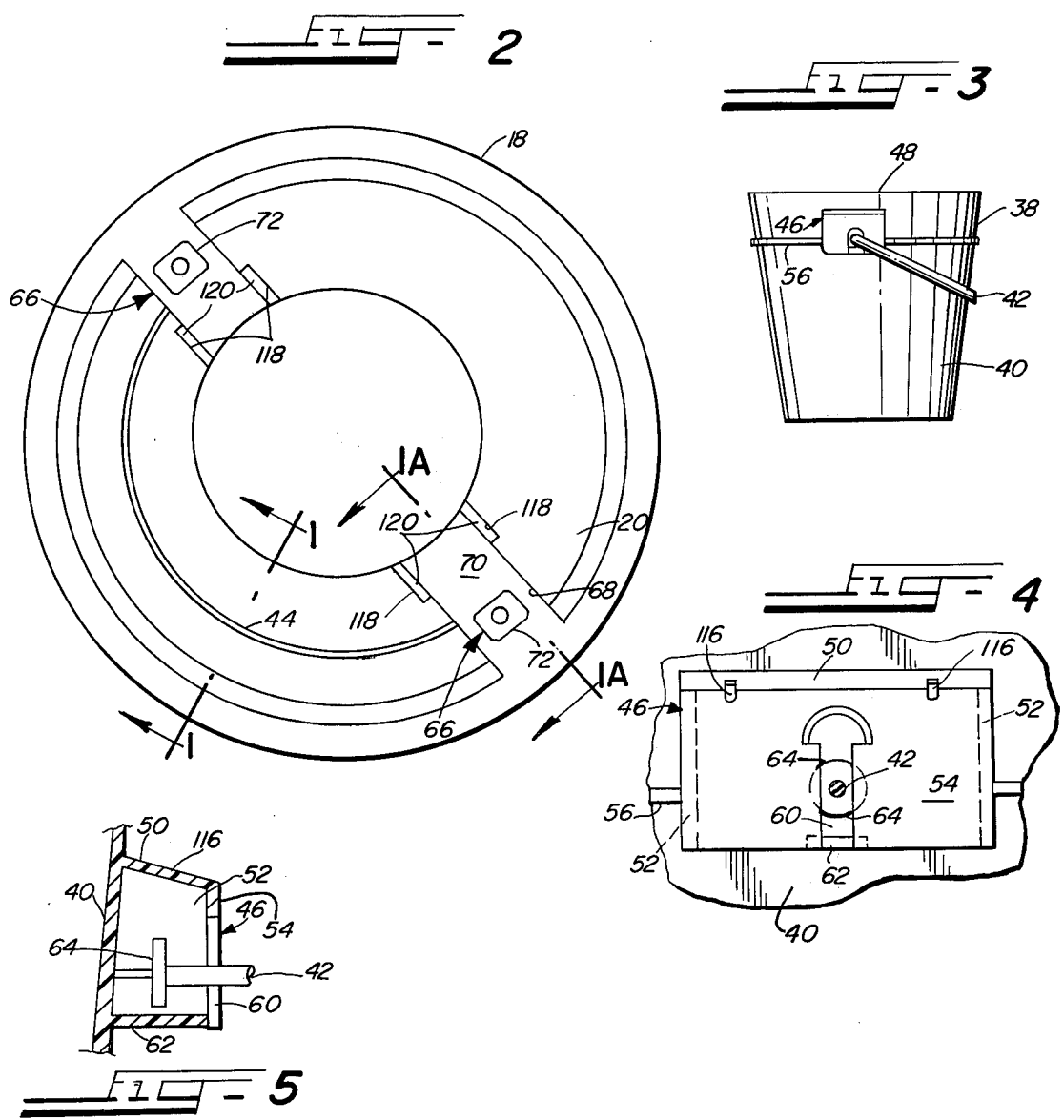

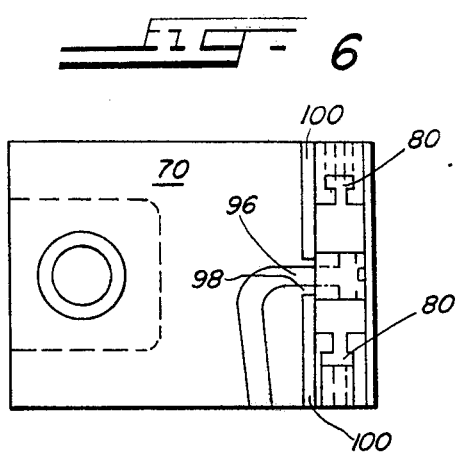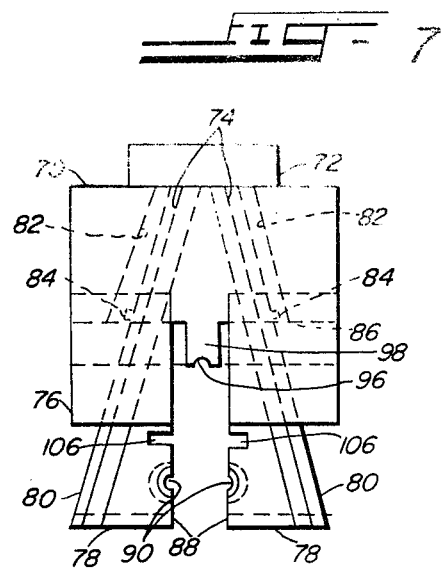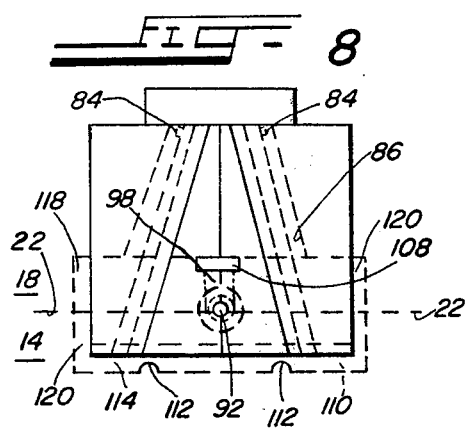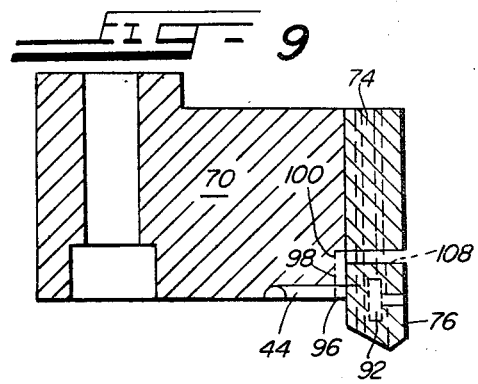

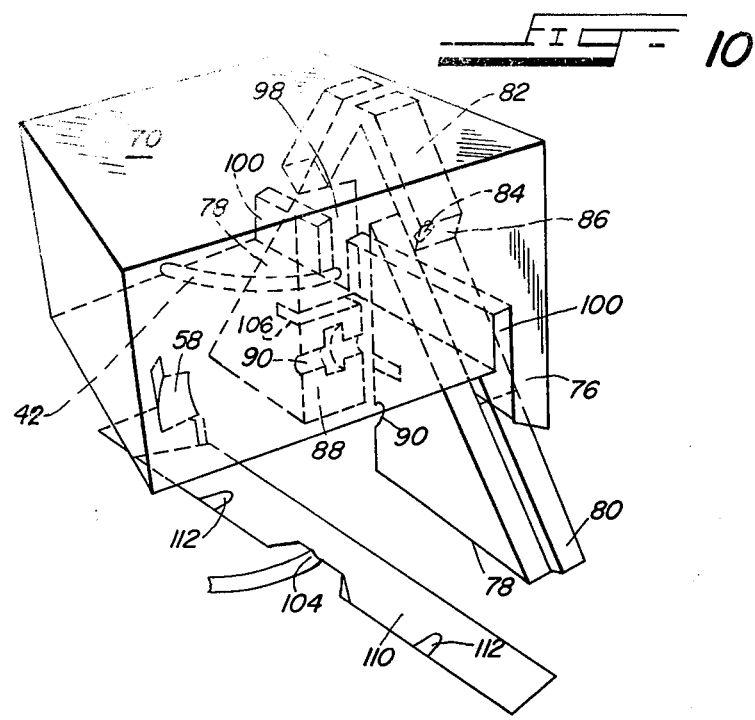
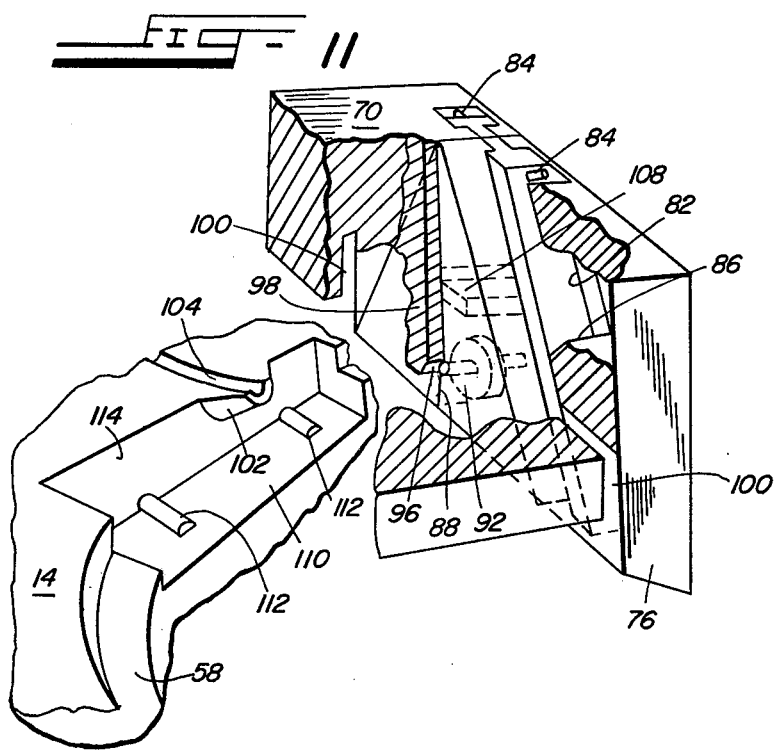

PIVOT MOLD ASSEMBLY

BACKGROUND OF THE INVENTION

Field of the Invention

This invention relates in general to apparatus for molding a pivot and more particularly to an improved apparatus and method for molding an internal pail pivot and the improved article formed thereby.

In my copending application Ser. No. 739,198, filed Nov. 5, 1976, now abandoned, there is disclosed a mold and method for molding a freely pivotable bail on a bucket or can, simultaneously with the molding of the bucket. The mold incorporates a ring member for forming internal and external bearing surfaces on the bail or handle and on the bucket respectively. After the bearing surfaces are formed, the ring member is moved axially or radially of the bucket past a bail retaining member. This movement is provided by hydraulically operated members which extend into a mold passageway, thereby presenting a somewhat complicated and expensive mold arrangement, while a relatively large spacing between the inner and outer bearing surfaces is required to receive the ring member.

SUMMARY OF THE INVENTION

The present invention utilizes an extremely simple and ingenious arrangement for enabling the molding of an internal, freely pivotable handle on a pail, bucket, or can. This is done by molding the handle or bail through a passage in a skirt wall spaced from the pail wall, and molding a stop boss on the handle to prevent retraction of the handle through the passage. The passage or slot is closed at opposite ends.

To provide this arrangement without the use of additional hydraulically movable members, as disclosed in the aforementioned application, the present invention makes use of the conventionally movable upper and lower mold rings forming the annular wall of the pail. The lower ring is provided with a recess for receiving a downwardly extending pair of slides on the upper ring for forming the skirt wall therebetween and the passage through which the handle extends.

Intermediate the skirt and pail walls, the slides are moved laterally by guideways of the upper ring in response to downward movement of the upper ring until they engage to form the mold cavity for the stop boss on the handle and the cavity forming a flange wall closing the skirt wall passage.

On opening the mold the upper ring moves upwardly to move the slides laterally, and when they are spaced sufficiently to clear the stop boss and the slot closing wall, they are also retracted from the recess in the lower ring to enable release of the pail.

It is therefore one object of the present invention to provide an improved mold and/or method for forming a pivot assembly.

It is another object of the present invention to provide an improved mold and/or more economical method for forming a freely rotatable bail on a pail.

It is still another object of the present invention to provide a more economical assembly of a plastic pail and a freely rotatable plastic bail.

Other objects and features of the present invention will become apparent on examination of the following specification and claims together with the drawings.

BRIEF DESCRIPTION OF THE DRAWINGS

FIG. 1 is a partial sectional view taken along line 1—1 of FIG. 2, illustrating the relevant portions of a mold assembly incorporating the principles of the present invention;

FIG. 1a is a partial sectional view taken along line 1a—1a of FIG. 2;

FIG. 2 is a bottom plan view of the upper ring portion of the upper mold assembly;

FIG. 3 is a side elevational view of a pail formed in the mold assembly shown in FIG. 1 and incorporating the principles of the present invention;

FIG. 4 is an enlarged fragmentary front view of the retaining boss on the pail wall;

FIG. 5 is an enlarged fragmentary side view of the retaining boss shown in FIG. 4;

FIG. 6 is a bottom elevational view of the insert assembly of the upper ring;

FIG. 7 is a front elevational view of the insert assembly in raised open position;

FIG. 8 is a front elevational view of the insert assembly in closed molding position with a portion of the lower ring shown diagramatically rotated 90° from FIG. 1a;

FIG. 9 is a side elevational view of the insert assembly;

FIG. 10 is a diagramatic perspective view of the insert assembly in raised position together with a relevant portion of the lower ring; and FIG. 11 is a perspective broken sectional view of the insert assembly in closed molding position together with an exploded relevant portion of the lower ring.

DESCRIPTION OF THE PREFERRED EMBODIMENT

The relevant portion of a mold assembly incorporating the principles of the present invention is indicated by the reference character 10 in FIG. 1. The assembly 10 is shown in section taken along transverse diametric planes and includes an upper mold assembly 12, a lower split ring assembly 14 and an inner core assembly 16.

Only a split ring portion 18 of the upper mold assembly 12 is shown; however, it will be understood that the upper mold assembly 12 includes a back wall assembly for portion 18 to form a cup shape and that the ring assembly 14 mates or engages with an annular lower flange portion 20 on ring 18 as seen in FIG. 1 along a parting line or surface 22. The flange portion 20 together with the ring assembly 14 are seated in an annular recess 24 defined by a radially outwardly extending cup shaped flange 26 of the core assembly 16.

The cup shaped flange 26 has a rim wall 28 for seating or engaging a radial outward portion of assembly 12 along a horizontal parting line, and the recess 24 is formed at the radially inward end of the rim wall 28 for seating flange 20 and ring 14. A radially inwardly and downwardly extending inclined parting line 30 is formed by the tandem outer inclined peripheral surfaces of flange 20 and ring 14 engaging the inclined axially extending surface of recess 24. In addition, an annular, horizontal parting line or surface 32 is between the lower surface of ring 14 and the bottom surface of flange 26.

The core assembly 16 has an axially projecting central portion 34 received in the hollow space encircled by assembly 12 and ring 14 to define therebetween a cup shaped mold cavity having an annular mold cavity portion 36 and forming a cup shaped plastic bucket, can or pail 38 seen in FIG. 3 with an annular wall 40 formed in mold cavity 36. A handle 42 is formed for the pail 38 in a mold cavity 44 defined by facing recesses in the lower surface of flange 18 and the upper surface of ring 14. Each end of the handle 42 is supported and secured for freely rotatable movement in a respective one of a pair of diametrically opposed or spaced hollow retaining bosses such as 46 formed on the annular wall 40 of the pail 38 at a position spaced from but adjacent to the open end 48 of the pail.

The hollow retaining boss 46 includes a top wall 50 and spaced side walls 52 extending radially outwardly from the annular pail wall 40 and joined at their radial outward end by a retaining skirt or front wall 54 to define an open bottom for the recess formed by the hollow boss 46. Radially outwardly extending annular walls 56 are also formed on annular pail wall 40 in a cavity 58 and each wall 56 extends from one side wall 52 of one boss 46 to a side wall 52 of the outer boss 46. Other rigidifying, radially outwardly extending annular walls may be formed on wall 40 intermediate the hollow bosses 46 and open end 48 if desired by suitable mold cavities at the radial inward end of ring 14 and in communication with mold cavity 36.

The skirt or retaining wall 54 of each boss 46 is provided with a passage or slot 60 located intermediate the spaced end or side walls 52 for passing or rotatably supporting an adjacent portion of the handle 42. One end of the slot 60 is closed adjacent the top wall 50 by a portion of retaining wall 54 and movement from the other or open end of the slot 60 is prevented by a flange wall 62 extending radially between an annular pail wall 40 and retaining wall 54, and integrally joined thereto adjacent the lower opposite edges of the slot 60 to form a rigid retaining boss for the rotatable handle 42. Thus wall 54 is connected at positions spaced circumferentially of handle 42 to the annular pail wall. The various orientations and directions described with reference to the boss 46 are those normally applied in use of the pail. However, it will be understood that the pail may be molded in an upside down position and that therefore the parts in the mold will normally be located in a position opposite to those described above so that, as shown in FIG. 1, the parts for forming the boss may hereafter generally be described with an opposite orientation.

The portion of the handle 42 passing through the slot 60 is provided with an enlarged, cylindrically shaped stop boss 64 formed adjacent the handle end intermediate the pail wall 40 and retaining wall 54. The stop boss 64 has a larger diameter or peripheral dimension than the space between opposite edges of slot 60, wherefore it cannot be retracted through the slot, and walls 54 and 62 confine its movement to between the ends of slot 60.

To form each hollow retaining boss 46 and the stop boss 64, with the pail 40, in single molding operation, the present invention employs an insert assembly 66 for each boss 46, located in diametrically opposite, radially extending slots 68 defined in the lower flange 20 on ring portion 18. Each insert assembly 66 comprises a support block 70 extending radially of the mold cavity 36 and secured to ring 18 by a fastening member extending through a rectangular boss 72, seated in a corresponding shaped recess of ring 18.

A pair of dovetail guides or guideways 74 are formed adjacent the radially inward end of block 70 as seen in FIGS. 6-10. These extend through a depending leg 76 on block 70 for guiding the movement of a pair of identical stop boss forming members or slides 78 each having a respective T-shaped or dovetail key 80 engaged in a respective one of the guides 74.

The guides or cams 74 extend vertically downwardly from the top of block 70 as seen in the drawings or axially of the cavity 36 from a position adjacent the central radially extending vertical plane of block 70 toward a respective outer vertical side surfaces or margins of the depending leg 76, so that they are each inclined to form adjacent legs of a triangle. The upper portion of each guide 74 has an enlarged parallel recess 82 to receive a respective stop pin 84 projecting outwardly from each key 80. The pins 84 each engage a stop wall 86 formed at the lower end of each enlarged recess 82 located intermediate the top and bottom ends of block 70 for lifting the respective slide member 78, when ring 18 is raised a predetermined distance on opening the mold as will be explained.

The members 78 each have a perimeter shape generally corresponding to a right triangle and are adapted to engage along the elongate right angle edge 88 generally coincident with the central vertical plane of block 70. A stepped cylindrical recess 90 in each edge 88 defines mating halves of a mold cavity 92, communicating at the radially inward end with annular cavity 36, to form the stop boss 64 and adjacent portions of the handle 42. At its radially outward end, cavity 92 communicates with a cavity portion 96 formed on a leg 98 extending into a slot 100 between leg 76 and block 70.

The lower portion of retaining wall 54 is formed in the slot 100 and the leg 98 forms a corresponding portion of the slot 60 in the retaining wall 54. The lower edge of leg 98 engages the upper surface of a projecting member 102 best seen in FIG. 11, on ring 14 to form the remainder of the slot 60, and a recess 104 in the projecting member 102 defines with recess 96 a mold cavity for the handle 42, which projects through the slot 60. The recesses 96 and 104 in turn communicate with recesses in block 70 and ring 14 defining handle cavity 44. A second recess 106 in each vertical edge 88 defines a mold cavity 108 for forming the flange wall 62 in communication with cavity 36 and with slot 100 at opposite side of leg 98 to join wall 62 to the lower edge of wall 54.

The lower corners of members 78 are spaced inwardly of the side vertical margins or edges of the depending leg 76. When the block 70 is raised with ring 18, the members 78 follow the guides 74 to space the edges 88 by a distance greater than the diameter of retaining or stop boss 64 and wall 62, as will be explained.

The leg 76 and the lower portion of members 78 are received in a generally rectangular recess 110 located at the radially inward end of ring 14 and in the upper surface thereof. A pair of spaced stop members 112 extend upwardly from the bottom wall of recess 110 and from the front vertical surface 114 of the recess 110 toward the mold cavity 36 but terminate at a position spaced from the mold cavity 36. The stop members 110 each engage the bottom surface of members 78 to space the members 78 from the bottom wall of the recess 110. This has the effect of driving the members 78 upwardly relative the leg 76 in response to the downward movement of leg 76 for enabling the edges 88 to meet on closure of the mold, as will be explained.

The spacing between the bottom surfaces of members 78, leg 76, and the bottom surface of recess 110 forms a mold cavity 114 best seen in FIGS. 1 and 8 in which the top wall 50 of boss 46 is formed at an angle of substantially 15° to the horizontal axis as the bottom surfaces of recess 110 and of leg 76 and members 78 are formed at a corresponding angle. The stops 112 form correspondingly shaped slots 116 in the boss 46. The side edges or surfaces of leg 76 are spaced from the side or radial margins of recess 110 and from radially extending side portions of the slot 68 in ring member 18 to define mold cavities 120 in communication with mold cavities 38 and 114 for forming side walls 52 of the boss 46.

The margin or outer surface of projection 102 tapers inwardly towards a flat front surface for engagement with the surface of members 78 and projects through the wall 54 of the boss 46.

The mold 10 is conventionally operated by assembling ring members as shown in FIG. 1 to form the cup shaped mold cavity including the annular mold cavity 36 for forming wall 40. Ring member 14 is received in recess 24, whereafter the assembly 12, including ring 18 and flange 20 carrying assembly 66, are moved downwardly for engagement with ring 14.

The slides 78 are normally extended from leg 76 during the downward movement and held from disengagement by stop pins 84, engaged with stop walls 86. As descent of ring 18 continues, the bottom surfaces of slides 78 engage stops 112 in recess 110. The continued downward movement of block 70 drives the slides 78 toward each other under the influence of the guide surfaces 74.

The leg 76 descends, until the vertical edges 88 of slides 78 engage to form cavities 92 and 108 with the leg 76 positioned in the recess 110 and the lower edge of leg 76 engages the upper surface of projector 102 for defining the mold cavities in which the boss 46 together with the boss 64 and handle are formed.

A plastic molding powder or similar substance is then injected into the mold cavity 38 generally through a passage (not shown) in the back wall of assembly 12 and the powder flows through the cavity 36 into cavity 92, 108, 114 and 120 to form boss 46. Thereafter the mold is opened in any well known manner to move ring 18 upwardly.

A ring 18 and the leg 76 moves up, the slides 78 are cammed from each other, pulled by the plastic part itself along the guides 74 to move edges 88 apart. The slides 78 separate by a distance permitting the edges of mold cavities 92 and 108 to clear the boss 64 and wall 62 respectively. Pins 84 then engage stop walls 86 and the slides 78 are lifted from recess 110 and from between walls 54 and 40.

The ring 14 may now be raised in any well known manner to free the bucket 38 from the mold cavity and the bucket 40 is then conventionally disengaged from the ring 14.

The portion of the handle connecting the stop boss 64 with the annular pail wall 40 may have a diameter of only 0.045 inch, and does not prevent free rotation of the handle, since it either breaks off in response to rotatable movement or twists so easily as to permit full rotation without any significant restraining force due to its small size.

The foregoing description relates to an improved method and mold for forming a pivot together with the article formed thereby, but the inventive concepts are not believed limited to the foregoing description but are believed covered in the accompanying claims.

I claim:

1. A mold assembly for forming a retaining portion on a freely rotatable pail handle extending through a passage formed in one wall of the retaining portion to a position intermediate said one wall and an annular wall of the pail, formed by a pair of ring members with said annular wall spaced from said one wall and integrally interconnected with said one wall by a pair of spaced side walls and a top wall at a plurality of positions spaced circumferentially of said handle, the improvement comprising:

a pair of slide members extended between said one wall and said annular wall and into engaging relationship in response to axial movement in one direction of one of said ring members to define a mold cavity for forming said retaining portion on said rotatable handle;

and means operatively associated with said slide members, for disengaging said slide members and for guiding said slide members axially of said annular wall to disengage said slide members from between said one wall and annular wall in response to axial movement of said one ring member in the opposite direction.

2. The assembly of claim 1 in which the other ring member has a recess for defining a surface of said one wall, spaced side walls, and said top wall.

3. The assembly of claim 2 in which said means includes guided means on said one ring member and guide means on said slides for guiding said slides transverse to the axial movement of said one ring member.

4. The assembly of claim 3 having means in said other ring member recess for engaging said slides to enable said slides to move, in response to said one ring member moving in said one axial direction, in said guide means relative to each other.

5. The assembly of claim 4 having means in said slides for forming a flange wall mold cavity in communication with said annular wall and said one wall.

6. The assembly of claim 5 having means on said one ring member for forming said passage.

7. In the assembly of claim 6, means on said other ring member and on said one ring member forming a mold cavity in said passage for forming a portion of said handle extending through said passage.

* * * * *